No. 610,111. Patented Aug. 30, 1898.
F. X. WAGNER.
VELOCIPEDE.
(Application filed Dec. 7, 1897.)

(No Model.)

WITNESSES:
E. Wolff.
Chas. E. Poensgen.

INVENTOR:
Franz X. Wagner.
BY
Hauff & Hauff
ATTORNEYS.

UNITED STATES PATENT OFFICE.

FRANZ X. WAGNER, OF NEW YORK, N. Y.

VELOCIPEDE.

SPECIFICATION forming part of Letters Patent No. 610,111, dated August 30, 1898.

Application filed December 7, 1897. Serial No. 661,067. (No model.)

*To all whom it may concern:*

Be it known that I, FRANZ X. WAGNER, a citizen of the United States, residing at New York, in the county and State of New York, have invented new and useful Improvements in Velocipedes, of which the following is a specification.

By means of this invention the propulsion of a bicycle, velocipede, or other vehicle can be effectively and satisfactorily attained, as set forth in the following specification and claim and illustrated in the annexed drawings, in which—

Figure 1:
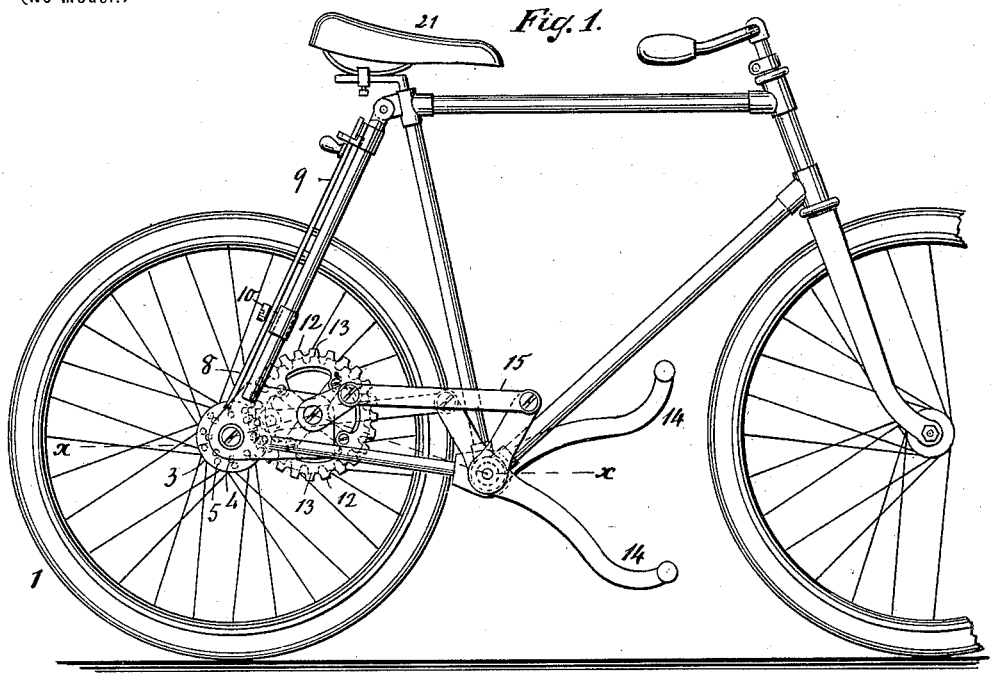
Figure 2:
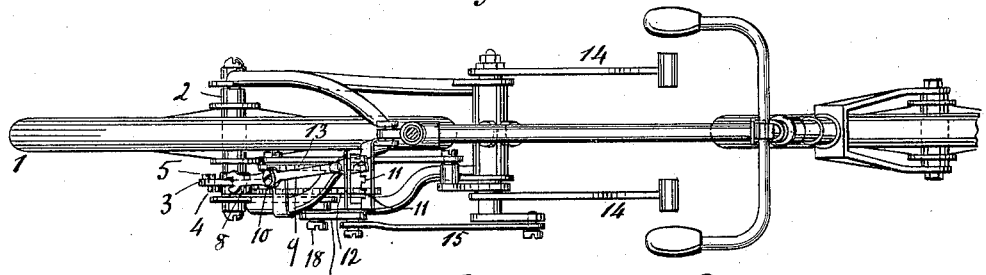
Figure 3:
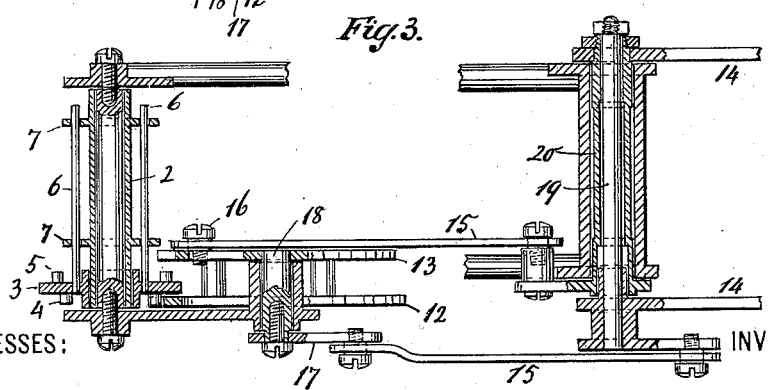

Figure 1 is a side elevation of the velocipede. Fig. 2 is a plan view of Fig. 1. Fig. 3 is a section along line $x$ $x$, Fig. 1.

The driving-wheel 1 is shown with a shaft or axle 2. By means of a differential transmission-gear and a differential driving-gear shiftably arranged the speed of the driving-wheel can be regulated, as presently explained.

The transmission-gear is shown in form of a disk 3, shiftably arranged on driving shaft or axle 2 and having the differential teeth or gear arrangement 4 and 5. For example, eight teeth 4 could be arranged on one side of disk 3, while the oppositely-arranged set 5 comprises ten teeth. When enumerating teeth, however, it is understood that the number of teeth can be varied, as the invention is not limited to any fixed number of teeth.

The transmission-gear, while shiftable relatively to the driving-wheel 1, cannot turn independently thereof, as such gear, Fig. 3, feathers or connects with the wheel 1 by one or more prongs or pins 6, engaging holes or eyes or perforated rims 7 on the wheel 1 or its hub. The shifter is shown in form of a lever 8 9, fulcrumed at 10. By engaging lever or shifter arm 9 to one of the outer notches or lock-shoulders 11, Fig. 2, the gear 3 will be shifted to one position or extreme, or so as to bring one of its tooth sets into action, while the shift of the lever 8 9 to the other extreme will bring the other tooth set of the transmission-gear into action. The shifter, when in intermediate position or engaged to the intermediate of the three slots 11, will hold gear 3 inactive or idle, as presently set forth.

The driving-gear is shown as composed of two wheels or disks 12 and 13, connected or secured together to rotate as one disk. These disks 12 and 13 are differentially toothed. Say, for example, that disk 12 has twenty-four teeth and disk 13 ten teeth. Then if the shifter-arm 8 has moved gear 3 to bring its eight-tooth set 4 into mesh with the twenty-four teeth of disk 12 then one revolution of the driving-gear will effect three revolutions of the gear 3 and wheel 1. The gear 3 being shifted to the other extremes, its ten-tooth set 5 meshing with the twenty-tooth set 13 of the driving-gear, the wheel 1 turns twice to one revolution of the driving-gear 12 13.

The disks 12 and 13 are sufficiently spaced or separated, so that the shiftable disk 3, located between the disks 12 and 13, can be shifted to an intermediate or neutral position, so that neither tooth set 4 or 5 meshes with the driving-gears 12 13. Thus when coasting or going downhill, for example, the gear 3 being shifted out of action, the driving-gear 12 13, with its pedals 14, can remain at rest while wheel 1, with gear 3, keeps rotating.

The pedals or foot-levers 14, respectively, connect by links 15 with the driving-gear 12 13, one of the links having a pin or crank connection at 16, Fig. 3, with the disk 13, and the other link connecting with crank 17 on shaft 18 of the driving-gear. The levers or pedals 14 can have a common turning point or fulcrum while being capable of swinging or moving independently of one another, one of the pedals having its shaft or bearing 19, Fig. 3, located within or extended through the other pedal-shaft 20, shown tubular in form.

The handle portion or arm 9 of the shifter 8 9 being extended sufficiently close to the saddle or seat 21, Fig. 1, is within reach of the rider.

What I claim as new, and desire to secure by Letters Patent, is—

A driving-wheel combined with a transmission-gear comprising a disk having differential teeth or gears, made to extend in opposite directions from the sides of the disk, and a driving-gear comprising two differentially-toothed spaced disks, said transmission-gear being shiftably located between the driving-disks, substantially as described.

In testimony whereof I have hereunto set my hand in the presence of two subscribing witnesses.

FRANZ X. WAGNER.

Witnesses:
W. C. HAUFF,
E. F. KASTENHUBER.